3,236,173
CONVEYOR USEFUL IN A CONTINUOUS
BREWING APPARATUS
Robert H. Wohleb, 715 S. Washington St., Olympia, Wash.
Continuation of application Ser. No. 8,769, Feb. 15, 1960.
This application Mar. 23, 1964, Ser. No. 354,510
16 Claims. (Cl. 99—278)

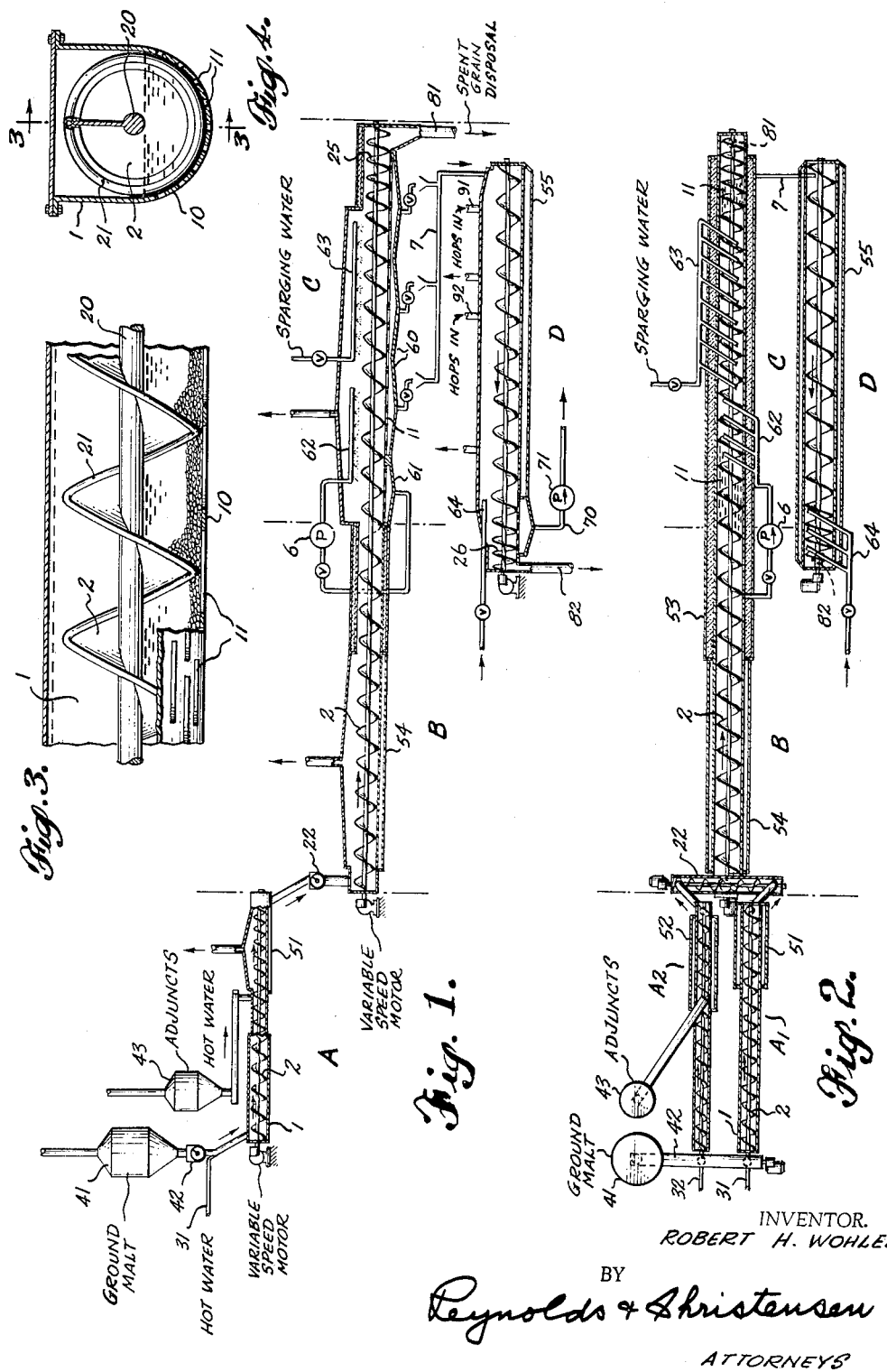

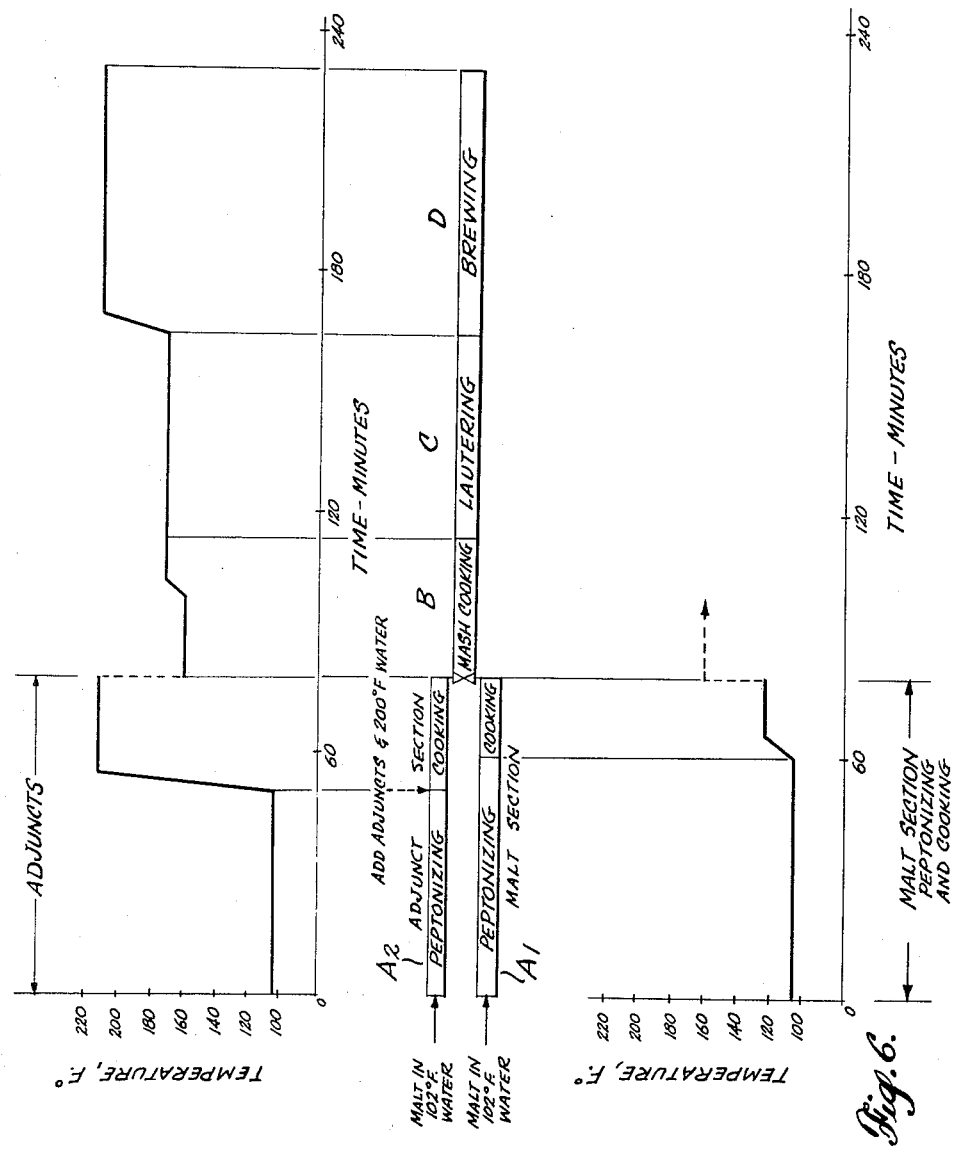

This application is a continuation of my application Serial No. 8,769, filed February 15, 1960, now abandoned.

This invention concerns the handling and conveying of a material that is primarily liquid, although it can include solids suspended in or settling out of the liquid. More especially it concerns continuous handling and conveying of such material, through zones where additional liquids or additional solids are added, or are drained off or separated, and/or where the materials are treated as they advance, as by cooking, sparging, brewing, and the like.

It is a primary purpose of the invention to provide a conveyor for such material undergoing such treatment that although the operation is a continuing one, yet will segregate the material into separate batches, and will maintain the batches thus segregated throughout their passage through a plant, to the end that during their passage each batch is treated alike, and all arrive at the delivery point like all other batches in all respects, and when mixed there will constitute a uniform product that can be duplicated, as may be required, by similar treatment of like products, assuming reasonable uniformity of the ingredients.

It is also an object to provide such a conveyor that will be especially suited for use in a plant for the continuous brewing of beer, or for analogous purposes.

Also, it is an object to provide such a conveyor, and such a plant incorporating the same, that shall be simple, inexpensive, reliable, and compact, and that will require a minimum of investment for any given capacity.

The invention is incorporated in a conveyor that includes a trough that has a semi-cylindrical bottom portion, disposed with its axis horizontal or substantially so, as hereinafter explained, with a helical screw conveyor the blade whereof extends in substantially fluid-tight rotational engagement with the semi-cylindrical bottom portion, so that the rotational axis of the screw is also substantially horizontal. This divides the space lengthwise of the trough and below the rotative axis into a plurality of separate compartments that are incapable of communicating one with another so long as care is taken to avoid the liquid level rising to or above the rotative axis. Each such compartment travels lengthwise of the trough as the screw rotates, each segregating its individual batch of liquid material from batches in other compartments, and each compartment in succession can travel through zones where the material within it can be heated, drained, added to, or otherwise treated, each compartment individually, yet each identically with all other compartments, by a continuous operation of heating, adding draining etc., at fixed stations in the length of the trough, care being taken to prevent overfilling of the compartments to or above the level of the rotative axis. If drainage is required, the trough bottom can be perforated at appropriate portions of its length. If addition of liquid to compensate for drainage is required, this can be effected in appropriate relation to drainage zones. If addition of solids is required, this can be effected, uniformly in each compartment, so long as or to the extent that the liquid level does not rise as far as the axis of rotation of the screw. If deepening of a filter bed of solids is required, to slow down drainage of liquids in some portion of the trough, this can be done by decreasing the pitch of the screw conveyor in this portion, or by other appropriate measures.

Such a conveyor will be found suitable for many purposes. It may be useful in cooking fruits, etc., for canning, or for brewing and dehydrating of coffee in the manufacture of instant coffee. It has been proposed as especially suited for use in the continuous brewing of beer, from the malt and adjunct peptonizing stage to the hot wort stage, ready for fermenting, and particularly in each of the lautering and brewing stages, or in those two stages conjointly. It will therefore be described, and its use illustrated, by reference to a continuous beer brewing apparatus.

The brewing of beer involves many variables. Among these are variations in the mineral content of the water supply, in the malt and its grits, in the adjuncts which are almost always used, in time and temperature factors, and in the desired color, taste, strength, and aroma of the beer. Some of these variables are matters of choice, but others are uncontrollable and variations must be compensated for. Brewing has heretofore been a batch operation for the most part, since batch operation lends itself well to proper compensation, to achieve the desired uniformity of the product, such as is difficult with a continuous process. The batch operation is, however, uneconomical in a number of ways.

By use of the conveyor of this invention it is possible to brew beer by a continuous brewing operation, while still maintaining the liquid wort and the solids correctly and uniformly admixed in small batches, certainly in the lautering and brewing stages, and preferably also in the preceding peptonizing and cooking stage, for the malt and for the adjuncts, and in the mash cooking stage, while maintaining the successive batches segregated and individually distinct, the batches mixing together not at all or only as they are mixed under conditions which insure uniformity as the materials progress through such stages or advance to subsequent stages, and the solids in which successive batches are continuously discharged when spent.

By this invention, by appropriate modification of the conveyor to accommodate particular conditions in a given zone, grits or other solids in the separate batches in individual compartments can be used as filter beds for the liquid material, such as the wort, whereby to extract most fully the desired constituents, and to enable gravity dumping or discharge of the spent solids (malt and adjuncts, and hops) at the end of each appropriate stage.

Similarly, the beer can be brewed continuously by the use of the conveyor of this invention, in such a way that control of time and temperature factors, differing in different parts of a single stage, and in the different stages, can readily be effected, notwithstanding the contiguity of the different individual batches.

The conveyor of this invention is made flexible and simple, by appropriate modification or rearrangement to accommodate differences in building layout, kind or type of beer, and the like.

In the accompanying drawings the invention is shown, largely diagrammatically, incorporated in a typical continuous brewing plant, by way of example. The invention will be described in detail as used for this purpose. The brewing plant and parts thereof, as well as the conveyor broadly, for whatever purpose it may be used, are considered to be different aspects of my invention, and both are claimed herein.

FIGURE 1 is a side elevational diagram, and FIGURE 2 is a diagram in plan view, of the typical plant.

FIGURE 3 is an enlarged vertical axial sectional view of a trough and feed screw employed in at least certain stages, and FIGURE 4 is a transverse sectional view through the same.

FIGURE 5 is a block diagram, in plan, of the complete plant; FIGURE 6 is a time-temperature graph of the malt peptonizing and cooking stage, coordinated with FIGURE 5; and FIGURE 7 is a like time-temperature graph of the adjunct peptonizing and cooking stage and of all subsequent stages, also coordinated with FIGURE 5.

The brewing of beer to include the drawing off of the hot wort involves four distinct stages, the initial stage of the four being usually (in the United States) a double stage, involving the peptonizing and cooking of ground malt in one section, and the peptonizing and cooking of adjuncts in a parallel or coordinate section, but the two sections are kept distinct because the time and temperature factors are different in the two parallel sections, the finished products whereof are then mixed at the initiation of the second stage, mash cooking. The brewers of beers of certain types do not use adjuncts, hence in such cases the use of this section can be dispensed with. After the second, mash cooking, stage the brew goes through the third or lautering stage, where water is added, and filtered out wort is readded, and at the ends of that third stage the wort is filtered or drained out and the spent mash is discharged. The wort proceeds to the fourth, brewing stage, where hops are added, and at the conclusion of the brewing stage the hot wort is drained and delivered to the hot wort tank, and spent hops are discharged. In the usual brewing operation a batch proceeds as a unit by means of valve-controlled conduits, open only during transfer, from one tub or kettle to the next, in each of which the batch rests while the complete stage is performed.

Illustrating use of the present invention in continuous brewing, as contrasted to the usual batch brewing, hot water and ground malt grits are continuously supplied in measured quantities and desired ratio to the initial stage A, or to one of two parallel sections thereof A1 or A2, and hot water and adjuncts are similarly supplied to the other such section. These constituents are desirably segregated immediately into successive and uniform batches, and after admixture of the products of the two parallel sections, at the end of the first stage proceed, again as successive and uniform individual batches, through the second, third, and fourth stages. Withdrawals and admissions occur in the lautering and the brewing stages, but are accomplished in a manner to maintain the uniformity of the segregated individal batches. The stages A, B, and C are shown substantially in alignment, and the stage D as reversed and benath stage C, but this is a matter that will be determined by the plant layout, and no particular orientation or arrangement of stages relative to one another is essential to the invention.

More particularly, the liquid and the solids entrained therewith are transported through the several stages in troughs 1 such as that shown in FIGURES 3 and 4, and designated 1C, of semi-cylindrical form at the bottom 10, within which a helical feed screw 2 is disposed, fitting closely against and coaxial with the bottom 10. This defines individual compartments below the level of the rotative axis. The trough and feed screw are disposed substantially horizontally, so that there is no tendency for liquid to spill lengthwise from one compartment to the next. Preferably the outer edge of the screw is fitted with a wiper strip 21, engaging the semi-cylindrical bottom of the trough, and since the screw blade is continuous from its axis 20 to its outer edge, it follows that each compartment defined between successive turns, and below its axis, is wholly separate from all other such compartments. Care is taken to avoid filling to or above the axis, as FIGURE 4 shows, hence each compartment contains an individual batch, kept separate from all other batches, and advanced, by unidirectional rotation of the feed screw, from one end of the trough 1 to the other end. By supplying liquids and solids at a constant and controlled rate using metering valves or other like controls, at fixed stations, and by maintaining the feed screw rotating at a constant rate, each batch is identical with every other. By regulating temperature factors at different parts of the length of the trough each batch is heated alike, and time factors can be regulated by such means as controlling the rate of rotation of the screw, or varying the pitch thereof in different parts of its length.

By way of example, in the initial section A, or A1 or A2, hot water is supplied at 31, 32, at a rate coordinated with the size and rate of advance of the screws 2 in the sections A1 and A2 respectively. Ground malt from hopper 41 and metered at 42 is supplied into the trough of section A1 at a constant rate, and adjuncts, if the brewer requires them, is supplied from a hopper 43, likewise in metered and constant amounts, to the trough of section A2. The two troughs are heated at 51, 52 respectively to bring the malt and the adjuncts to and to hold them at the desired cooking temperatures, after being, in some cases, peptonized first by the initially supplied hot water.

The cooked malt and adjuncts are then delivered, as by a right-and-left feed screw 22, to the second stage B. Here, after thorough mixing by the screw 22 they are delivered into the trough of stage B, which to distinguish it is designated 1B, in the initial portion whereof their mixing is completed. The screw of this section may be modified at this end, as by perforations, or diameter, pitch, etc., to effect such mixing, if desired. The so-constituted mash is then divided by the feed screw 2 in stage B into successive separate batches, and is advanced towards the opposite end of the mash cooking stage. Heat is supplied, as by the steam jacket 54 in the initial portion of this stage, to maintain the desired temperature, and extra heat can be supplied similarly, as is indicated at 55 in the later brewing stage, to raise the temperature to a proper mashing-off valve upon completion of saccharification. This elevated temperature should be held for a time, to which end insulation as at 53 may suffice, or enough heat may be added to counter any heat loss. Throughout the system such expedients (insulation or addition of heat to compensate for heat loss) may be used as required, although not elsewhere specifically shown.

The cooked mash continues into the lautering stage C, and the feed screw and trough (the latter designated 1C to distinguish it from the trough 1B of the mash cooking stage) may be continuous through the stages B and C. In the lautering stage the wort is normally drained gradually from the mash and filtered again through the same, and sparging water is similarly sprayed upon and filtered through the mash. Care is taken to avoid supplying liquid in quantities to raise the level to the rotative axis. The solids must be allowed to settle upon the bottom 10 of the trough, and this bottom should be perforated, as by the small slits 11 (see FIGURES 3 and 4) to drain off liquid and so to make space to receive added liquid. Liquid wort filtered out and drained through the slits may be pumped from the drainage sump 61 by a pump 6 and returned as a sparging liquid by way of spray apertures at 62. Sparging water is supplied by sprays at 63, and the drained-off wort from sumps 60 is delivered by conduits 7 to the start of the brewing stage D. Beyond the last sump 60 a chute 81 is provided to receive and dispose of the spent mash, which the feed screw delivers to that chute.

It will be noted, at the end of the lautering section, that the pitch of the feed screw 2 is lessened at 25. This has the effect of deepening the filter bed of spent mash, by squeezing it in the axial direction. The tendency to deepen the filter bed and to lessen the volume of each individual batch tends to maintain the depth of each batch nearly constant, until the last extract is drained off, and improves the efficiency of extraction. The final, nearly dry spent mash is removed at 81.

In the brewing stage, as in the lautering stage, the liquid wort and solids being treated are maintained in successive batches, uniformly constituted. The wort is supplied by way of conduits 7 from the lautering stage and metered for supply at a constant rate, is heated by a heater such as the steam jacket 55, and hops are added from hoppers (not shown) by way of inlets 91, 92 at appropriate points in the length of the trough, and in metered constant amounts in correct ratio to the wort. At the terminus of the brewing stage trough, designated 1D to distinguish it, its bottom is perforated, as at 11a, and the hot wort drains out and is delivered by conduit 70, assisted if need be by pump 71, to the hot wort tank or coolship (not shown). Additional hot sparging water, as needed, is added at 64. The spent hops continue with the screw and are dumped into the chute 82 for disposal. At the end of the brewing stage the pitch of the feed screw is decreased, as at 26, with similar results as in the lautering stage.

The processing of the wort thereafter, as the fermenting etc., is conventional, and is no part of this invention.

Slight reference has been made hereinbefore to time and temperature factors as regulated in the described process and apparatus. These factors are regulated by the brew master to suit his preference or in accordance with his experience, hence no hard and fast rule can be given, but coordinated FIGURES 5, 6 and 7 show a typical plan. FIGURE 5 blocks out the four stages in a continuous line, and FIGURE 6 illustrates the time-temperature graph of a typical malt peptonizing and cooking stage A1, while FIGURE 7 in the corresponding portion shows a similar graph of a typical and complemental adjunct peptonizing and cooking stage A2. The two end products, mixing, have an intermediate temperature. This is held for a period of time and then raised sharply to a temperature suitable to halt the mashing action, at mashing-off, in the mash cooking stage, shown in FIGURE 7, and this raised temperature is maintained in the lautering stage. The temperature is again raised and maintained in the brewing stage. All such time and temperature factors can be suited to the known rate of advance and length of the feed screws, and the known capacity of the chambers between successive helices of the screws. Temperature can be raised by suitable heaters, such as steam jackets, and held, as by insulation.

The conveyor has been described as it would be employed in the continuous brewing of beer. This illustrates in the different stages the various modifications it may undergo in various parts of its length to accommodate differing conditions, but the concept of segregating batches in individual noncommunicating compartments of a horizontally-disposed rotative helical screw conveyor wiping in substantially liquid-tight contact with the semi-cylindrical bottom of a trough, with the liquid level never permitted to rise to the level of the rotative axis, remains the same, and can be used for various purposes. Depending upon some specific purpose, the liquid can be drained from the trough, replenished, or readded to maintain the liquid level substantially constant, or solids can be added, or separated out by filtration or drainage, and time and temperature factors can be controlled. Each batch, in the individual compartments, is kept segregated from all other batches, yet each batch as it advances is subjected to the same treatment as are all the others, and the end result is uniformity of the treated products.

Accordingly, in its broader aspects the invention concerns a conveyor for whatever purpose, and in a specific aspect concerns a continuous brewing plant as a whole, and more particularly the lautering and/or the brewing stages thereof.

It should be pointed out again that it is essential to this invention that the trough be so disposed that it is so nearly horizontal that no liquid can spill lengthwise from one compartment to another. This does not depend appreciably upon the depth to which the compartments are filled, for with any appreciable inclination liquid will tend to spill at the sides of the screw. Moreover, since it is intended that the compartments be filled almost to the level of the rotative axis of the screw, for operation at maximum capacity, it is clear that any substantial departure from horizontal will defeat the purpose of the conveyor, and will tend to spill the contents, which are primarily liquid, from one compartment to the next lower, and will destroy the uniformity of the several batches. It is clear, also, that even solid contents should be kept below the level of the rotative axis, for if solids extend above that level they will tend to spill from one compartment to another, or liquid entrained with or absorbed by the solids will also tend to spill, in either case destroying the uniformity of the individual but separate batches.

I claim as my invention:

1. A conveyor for a material which is primarily a liquid, comprising a screw conveyor formed with a helical blade, and disposed with its axis horizontal, a trough encircling the bottom half of said blade, in substantially liquid-tight engagement with the same throughout the length of the blade, to define noncommunicating individual semi-cylindrical compartments entirely below the level of the blade's axis, the sides of the trough extending upwardly to a somewhat higher level, out of contact with the blade, means to rotate said blade unidirectionally within its trough, to advance the compartments lengthwise of the trough, and fixed positioned means to deliver materials, including liquid, to the trough in quantities not exceeding the capacity of each individual semi-cylindrical compartment as the compartments advance past said delivering means, whereby the level of liquid is always below the blade's axis.

2. A conveyor as in claim 1 wherein the trough's bottom portion is non-perforate, and hence liquid-impervious, in the region of the liquid-delivering means, and thence throughout at least the major portion of its length.

3. A liquid conveyor according to claim 1 wherein the trough bottom is perforated at its final end portion as a strainer and the screw conveyor is of reduced pitch in the same end portion of the trough, relative to the pitch thereof in the remainder of said trough, to slow the rate of advance of the solids strained from the liquid, and to deepen the filter bed formed thereby.

4. A liquid conveyor comprising casing means defining a substantially horizontal trough having a semi-cylindrical bottom portion and sides directed upwardly generally tangentially, at least a major portion of the length of said semi-cylindrical trough bottom portion being non-perforate and hence of liquid-impervious construction, a screw conveyor mounted coaxially with said trough bottom portion for unidirectional rotation therewithin, said screw conveyor having a blade extending helically thereabout at a helix radius substantially equal to the radius of said bottom portion about their common axis, to effect fluid-tight rotational engagement between said blade and said bottom portion and thereby to divide said trough bottom portion, below its axis and below its sides, into a series of individual, non-communicating, semi-cylindrical, and axially advancing compartments, and means for introducing a selected quantity of material, including liquid, less than the capacity of an individual compartment, to each successive compartment as the conveyor is rotated.

5. A liquid conveyor according to claim 4 wherein one end portion only of the trough has perforations in the bottom portion thereof for liquids-solids separation.

6. A conveyor as in claim 5, including additionally inlet means disposed at locations in the length of the trough which have the non-perforate bottom portion, for introducing solids to the successive compartments, in quantities consonant with the amount of liquid in each thereof, but insufficient to raise the liquid level above the axis of the screw conveyor.

7. In a plant for the continuous brewing of beer by the successive stages of malt peptonizing and cooking, mash cooking, lautering, and brewing, conveyor mechanism incorporated in at least the lautering and brewing sections for advancing liquids with entrained solids therethrough, said conveying mechanism comprising casing means defining a generally horizontal trough having a substantially semi-cylindrical bottom portion with sides directed upwardly therefrom, said bottom portion in the lautering section being perforated, but a major portion of the length of said semi-cylindrical bottom portion in the brewing section being non-perforate and hence of liquid-impervious construction, screw conveyor means mounted lengthwise of the trough in each section for rotation therewithin, said screw conveyor means having a blade extending helically thereabout in fluid-tight rotational engagement with the semi-cylindrical bottom of said trough to form a series of successive individual semi-cylindrical compartments along the length of said trough bottom portion and below the blade's axis, means to rotate said screw conveyor means unidirectionally, means at a fixed location in advance of the lautering section for introducing a predetermined quantity of such liquid, less than the capacity of a compartment, to each successive compartment as the conveyor is rotated and the successive compartments advance unidirectionally past such location, and means in the lautering section to introduce sparging liquid to the compartments approximately sufficient in volume to maintain the liquid level in the several compartments generally constant, despite filtration of the wort through the perforations in the lautering section.

8. A plant according to claim 7, including means at the exit end of the lautering section for deepening the bed of entrained solids in the compartments, to assist in maintaining the liquid level in preceding compartments.

9. A plant according to claim 7, including means for collecting and for returning, as at least a part of the sparging liquid introduced to the compartments, wort filtered through the perforated bottom of the trough in the lautering section.

10. A plant according to claim 7, including means for collecting and introducing at the entrance to the brewing section the wort filtered out in the lautering section, in quantities suffiicent to fill successive compartments therein to a level not higher than the axis of the screw conveyor means, and means for introducing hops to successive compartments of the brewing section, in its portion with imperforate bottom, in quantities insufficient to raise the level of the liquid wort above the axis of the screw conveyor.

11. A plant according to claim 10, including means at the perforate bottom portion of the brewing section to deepen and compress the solids, to expel the liquid, prior to discharge of the solids.

12. In a plant for the continuous brewing of beer by the successive stages of malt peptonizing and cooking, mash cooking, lautering, and brewing, conveyor mechanism incorporated in at least the brewing section for advancing liquids with entrained solids therethrough, said conveyor mechanism comprising casing means defining a substantially horizontal trough having a substantially semi-cylindrical bottom portion, the major portion of its length, in its initial portion, being non-perforate and hence of liquid-impervious construction, but being perforated in its final portion for drainage of liquid, screw conveyor means mounted lengthwise of said trough for rotation therewithin, said screw conveyor means having a blade extending helically thereabout in fluid-tight rotational engagement with the semi-cylindrical bottom of the trough, to form a series of successive individual semi-cylindrical compartments along the length of said trough bottom portion, means to rotate said screw conveyor means unidirectionally, means to maintain each compartment throughout the initial portion of the trough, filled with liquid to a level below the screw conveyor's rotative axis, and means located in the initial portion of the trough to admit hops into each successive compartment, as the compartments advance, in amounts to preclude raising the liquid level as high as the rotative axis.

13. A plant as in claim 12, including means to slow the rate of advance of the hops in the perforated final portion of the trough, to deepen the filter bed formed thereby during drainage of the liquid wort.

14. In a plant for the continuous brewing of beer by the successive stages of malt peptonizing and cooking, mash cooking, lautering, and brewing, conveyor mechanism incorporated in at least the lautering section for advancing liquids with entrained solids therethrough, said conveyor mechanism comprising casing means defining a substantially horizontal trough having a substantially semi-cylindrical bottom portion, and perforated for drainage of liquid at a predetermined rate, a screw conveyor means mounted lengthwise of the trough for rotation therewithin, said screw conveyor means having a blade extending helically thereabout in fluid-tight rotational engagement with the semi-cylindrical bottom of said trough to form a series of successive individual semi-cylindrical compartments along the length of said trough bottom portion, means to rotate said screw conveyor means unidirectionally, means at fixed locations in the length of the trough for introducing liquid at a rate such, in relation to the rate of drainage from the trough, that no compartment is overfilled as high as the rotative axis of the screw conveyor means, but the liquid level in each compartment is maintained substantially constant, at a level below such rotative axis.

15. A plant as in claim 14, wherein there are two separate liquid introducing means, one in the initial portion of the trough for reintroducing drained off liquid wort, and another in the final portion of the trough for introducing sparging liquid each at a rate to maintain the successive compartments substantially equally filled.

16. A conveyor for a material which is primarily a liquid, comprising a screw conveyor formed with a helical blade, and disposed with its axis horizontal, a trough encircling the bottom half of the blade, in substantially liquid-tight engagement with the same throughout the length of the blade, to define, at a level entirely below the level of the blade's axis, a plurality of individual, non-communicating semi-cylindrical compartments, means to rotate the blade unidirectionally within its trough, whereby such compartments advance lengthwise of the trough, and fixedly positioned means to deliver material, including liquid, into the trough in quantities insufficient to fill any compartment to the level of the blade's axis, but in like quantities in the several compartments.

References Cited by the Examiner

UNITED STATES PATENTS

| 1,685,534 | 9/1928 | Drahn | 23—267 |
|---|---|---|---|
| 2,146,692 | 2/1939 | Tiedman | 210—318 |
| 2,397,305 | 3/1946 | Wheat. | |
| 2,686,192 | 8/1954 | Bonotto. | |
| 3,005,398 | 10/1961 | Sandler | 23—270 X |

References Cited by the Applicant

UNITED STATES PATENTS

| 1,906,247 | 5/1933 | Buff. |
|---|---|---|
| 2,027,958 | 1/1936 | Carter. |

WALTER A. SCHEEL, *Primary Examiner.*

WILLIAM B. PENN, ROBERT E. PULFREY,
*Examiners.*

S. P. FISHER, *Assistant Examiner.*